United States Patent
Sutliff et al.

[19]

[11] Patent Number: 6,119,350
[45] Date of Patent: Sep. 19, 2000

[54] ROTARY CUTTING MEMBER FOR LAWN TRIMMERS

[75] Inventors: James W. Sutliff, Utica; Dallas W. Jones, New Hartford, both of N.Y.

[73] Assignee: Trim-A-Lawn Corporation, Utica, N.Y.

[21] Appl. No.: 08/862,374

[22] Filed: May 23, 1997

[51] Int. Cl.[7] .................................................. A01D 34/82
[52] U.S. Cl. .............................. 30/276; 30/347; 56/12.7
[58] Field of Search .................... 30/276, 347; 56/12.5, 56/12.1, 12.7, 295

[56] References Cited

U.S. PATENT DOCUMENTS

| | | | |
|---|---|---|---|
| 5,036,648 | 8/1991 | Hoffamann et al. | 56/12.1 |
| 5,617,636 | 4/1997 | Taggett et al. | 30/276 |
| 5,622,035 | 4/1997 | Kondo et al. | 56/12.7 |
| 5,640,836 | 6/1997 | Lingerfelt | 56/255 |
| 5,722,172 | 3/1998 | Walden | 30/347 |

*Primary Examiner*—M. Rachuba
*Assistant Examiner*—T. Anthony Vaughn
*Attorney, Agent, or Firm*—Shlesinger Arkwright & Garvey, LLP

[57] ABSTRACT

The present invention is directed to a rotatable cutting head for a powered trimmer comprising top and bottom cover members, the bottom member is adapted to be operably associated with the drive shaft of a trimmer and includes at least one pivot member for receiving a pivoting cutting element, a latch mechanism is provided on the top cover for engaging the pivot member when the top and bottom cover members are mated, the latch member is secured against the pivot member by centrifugal forces acting on the latch during operation of the trimmer. The cutting elements comprise blades or molded lines that are readily adapted to be interchanged within the cutting head without the need for tools or complex disassembly.

18 Claims, 3 Drawing Sheets

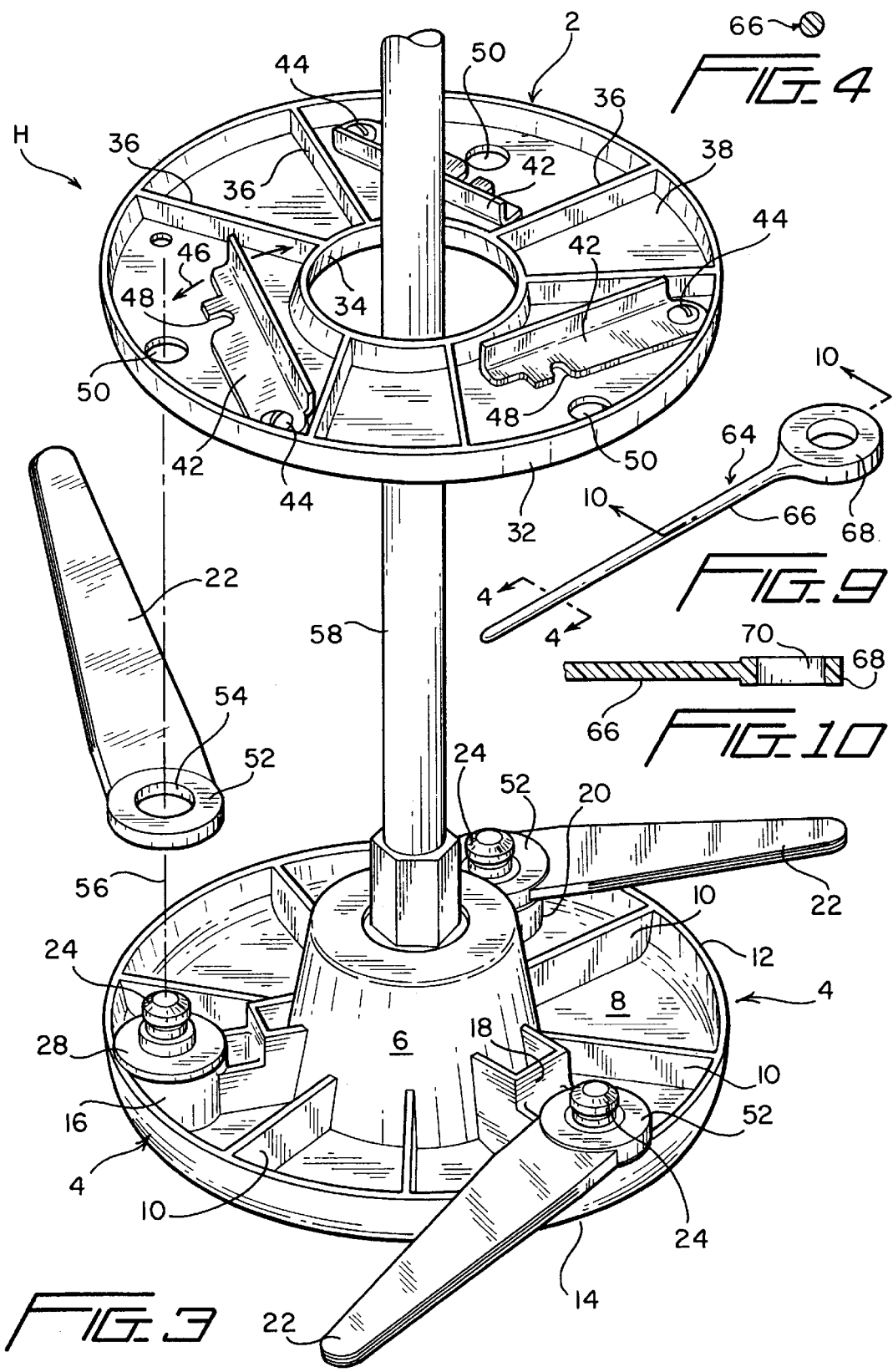

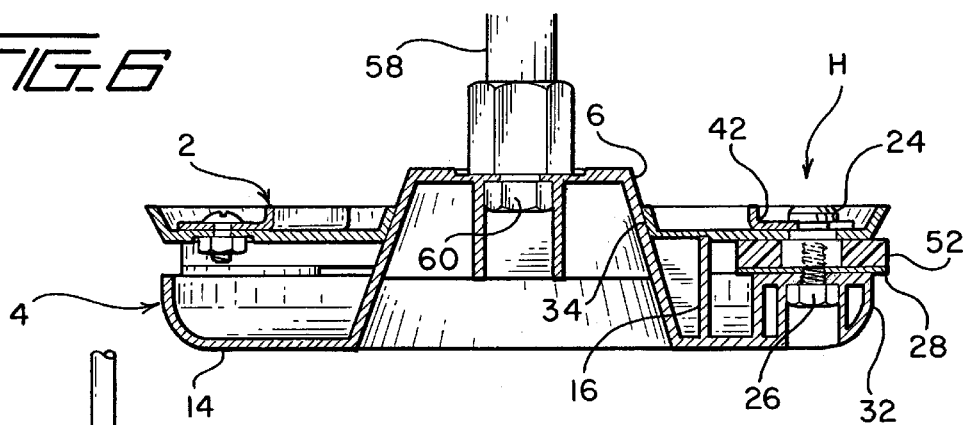
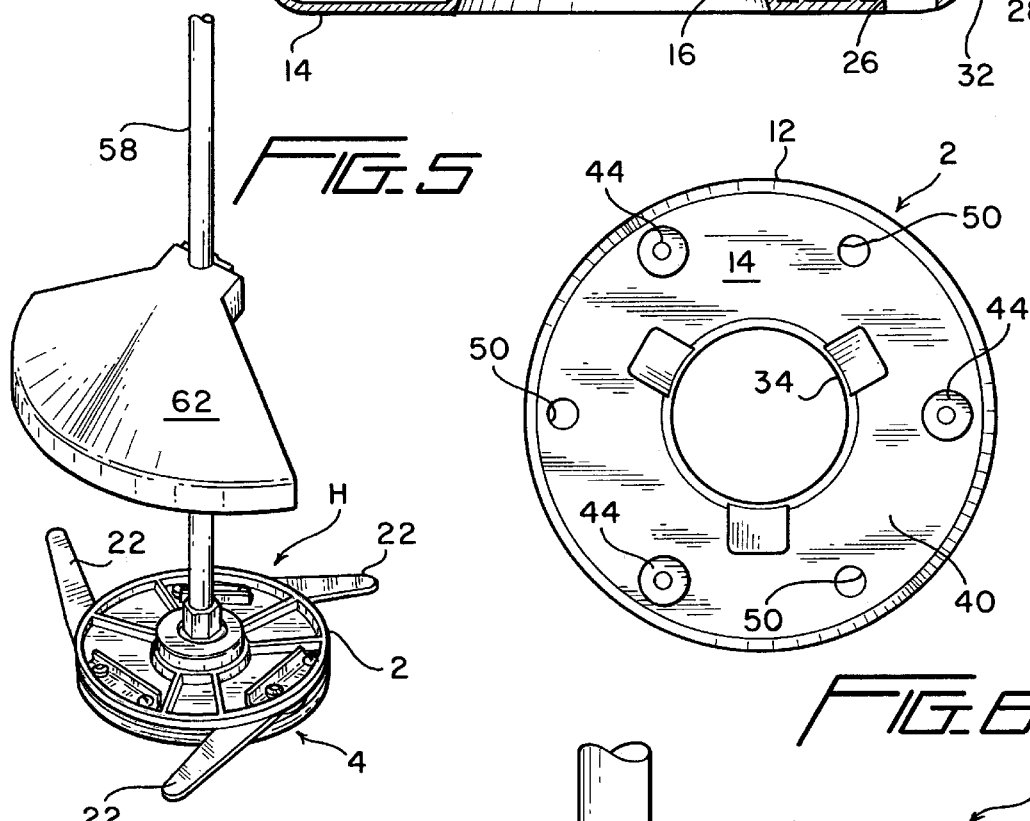
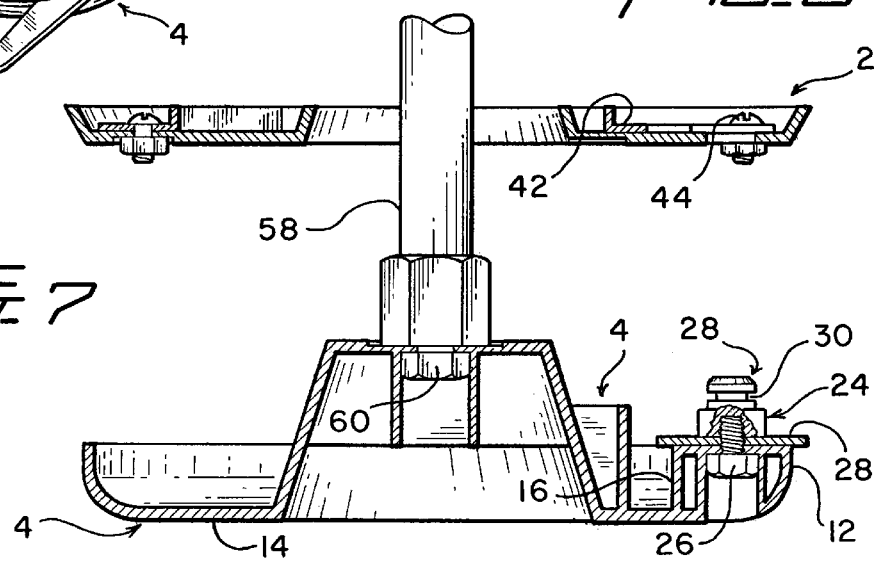

ROTARY CUTTING MEMBER FOR LAWN TRIMMERS

FIELD OF THE INVENTION

The present invention relates to a rotary cutting head for gas or electric powered trimmers and the cutting elements for such trimmers.

BACKGROUND OF THE INVENTION

In recent years, gas or electric powered lawn trimmers have become increasingly popular. Typically, the lawn trimmer will comprise a cutting head operatively associated with a rotating shaft driven by the gas or electric powered motor. Several fishing line cutting elements are secured to the perimeter of the cutting head whereby selective rotation of the cutting head causes the fishing line to flail outwardly and cut or trim the grass as it contacts it.

Although lawn trimmers employing flexible fishing line cutting elements work well enough on conventional grass, they have been found to be not entirely satisfactory. For example, certain types of thick or coarse vegetation cannot be effectively cut or trimmed with a fishing line cutting element. Consequently, it has been proposed to use flexible plastic cutting blades for cutting thick grass or woody growth. For the most part, consumers have found it necessary to own two different trimmers, each adapted to cut the different types of vegetation.

In view of the above, it is desirable to interchange the cutting elements of the cutting head in order to adapt the trimmer to the type of vegetation being trimmed. At the present, trimmers do not permit the cutting elements to be readily changed and in many cases, replacement of the entire cutting head is necessary. Tools must be used to open the cutting head and parts are often lost during disassembly and reassembly. As is apparent, the additional work required to change the cutting head elements prolongs an already laborious chore of cutting the grass.

In addition to the above, the fishing line cutting elements found on prior art cutting heads are prone to fraying and must be routinely replaced.

OBJECTS AND SUMMARY OF THE INVENTION

It is therefore an object of the present invention to provide a lawn trimmer and in particular a cutting head for a lawn trimmer that permits the metal edge plastic flail blades and the molded cutting lines to be quickly changed without the need for tools.

A still further object of the present invention is to provide a latch mechanism for a cutting head that will secure the flail blades or mold lines without the need for screws, nuts or similar attachment means.

A further object of the present invention is to provide a molded cutting line having improved cutting ability and wearability over prior art fishing line cutting elements.

Another object of the present invention is to provide a cutting head that may be readily installed on preexisting electric or gas powered trimmer devices Yet another object of the present invention is to provide a cutting head having a cover member for protecting the cutting elements and maintaining the interior of the cutting head free of debris.

A still further object of the present invention is to provide metal edge plastic flail blades that are reversible and readably interchangeable.

Yet another object of the present invention is to provide a cutting head having an improved shape; most notably, a rounded bottom edge that reduces the impact of the cutting head against flowers or other fragile material.

Still a further object of the present invention is to provide a single replacement cutting head that performs a range of trimming needs otherwise required by two separate trimming heads; that is, trimming against foundation, fence lines, trees, and thicker grass and woody growth.

In summary, the present invention is directed to a rotatable cutting head for a powered trimmer comprising top and bottom cover members, the bottom member is adapted to be operably associated with the drive shaft of a trimmer and includes at least one pivot member for receiving a pivoting cutting element, a latch mechanism is provided on the top cover for engaging the pivot member when the top and bottom cover members are mated, the latch member is secured against the pivot member by centrifugal forces acting on the latch during operation of the trimmer. The cutting elements comprise blades or molded lines that are readily adapted to be interchanged within the cutting head without the need for tools or complex disassembly.

These and other objects and advantages of the present invention will become apparent from a consideration of the following detailed description taken in conjunction with the accompanying drawings.

DETAILED DESCRIPTION OF THE DRAWINGS

FIG. 3 is an partially exploded view of the cutting head shown in FIG. 2;

FIG. 4 is a cross-sectional view of the molded line cutting element and taken along lines 4—4 of FIG. 9;

FIG. 5 is the device shown in FIG. 1 and further including a guard member attached to the drive shaft of the trimmer;

FIG. 6 is a sectional view taken along lines 6—6 of FIG. 1.

FIG. 7 is a cross-sectional view of the cutting head according to the present invention showing the cover disassembled from the base and without attached cutting elements;

FIG. 8 is a bottom plan view of the cutting head cover member;

FIG. 9 is a molded line cutting element according to the present invention; and

FIG. 10 is a cross-sectional view of the molded line cutting element taken along lines 10—10 of FIG. 9 with portions broken away.

DETAILED DESCRIPTION OF THE PREFERRED EMBODIMENT

Figure 1:
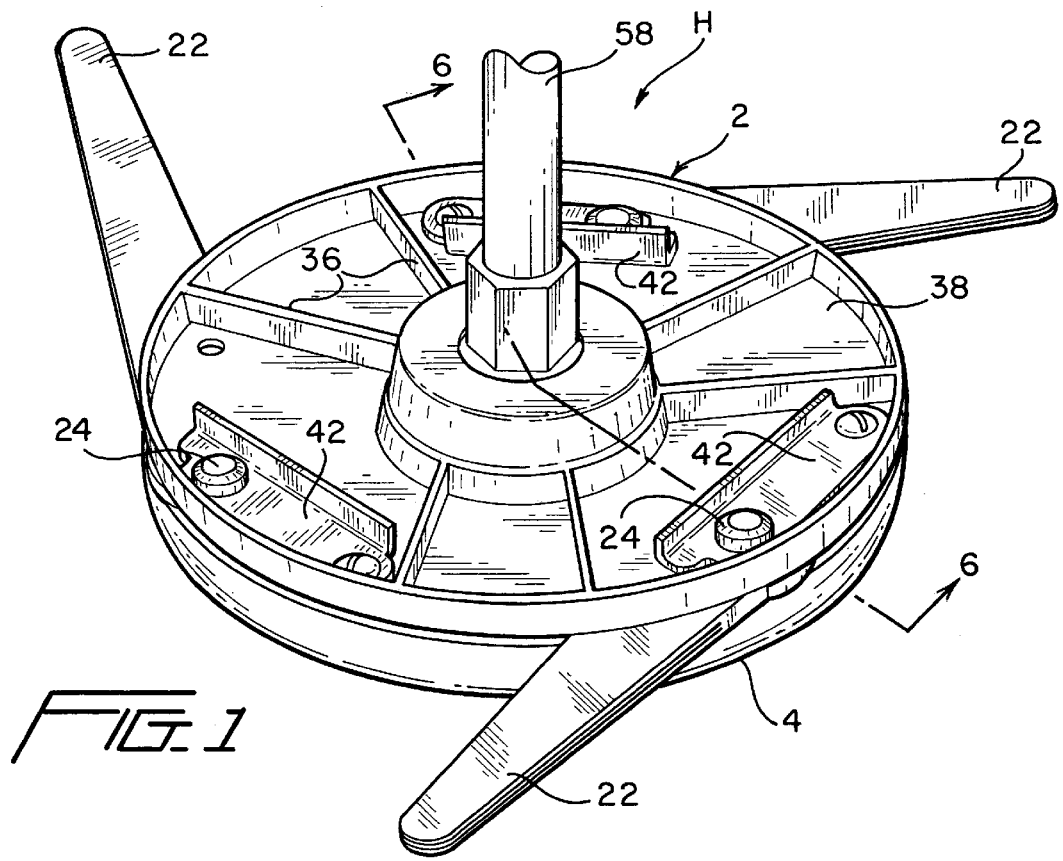
FIG. 1 is a perspective view of the assembled trimmer head according to the present invention provided with blade cutting elements and shown with the top cover of the cutting head in a locked position.
Figure 2:
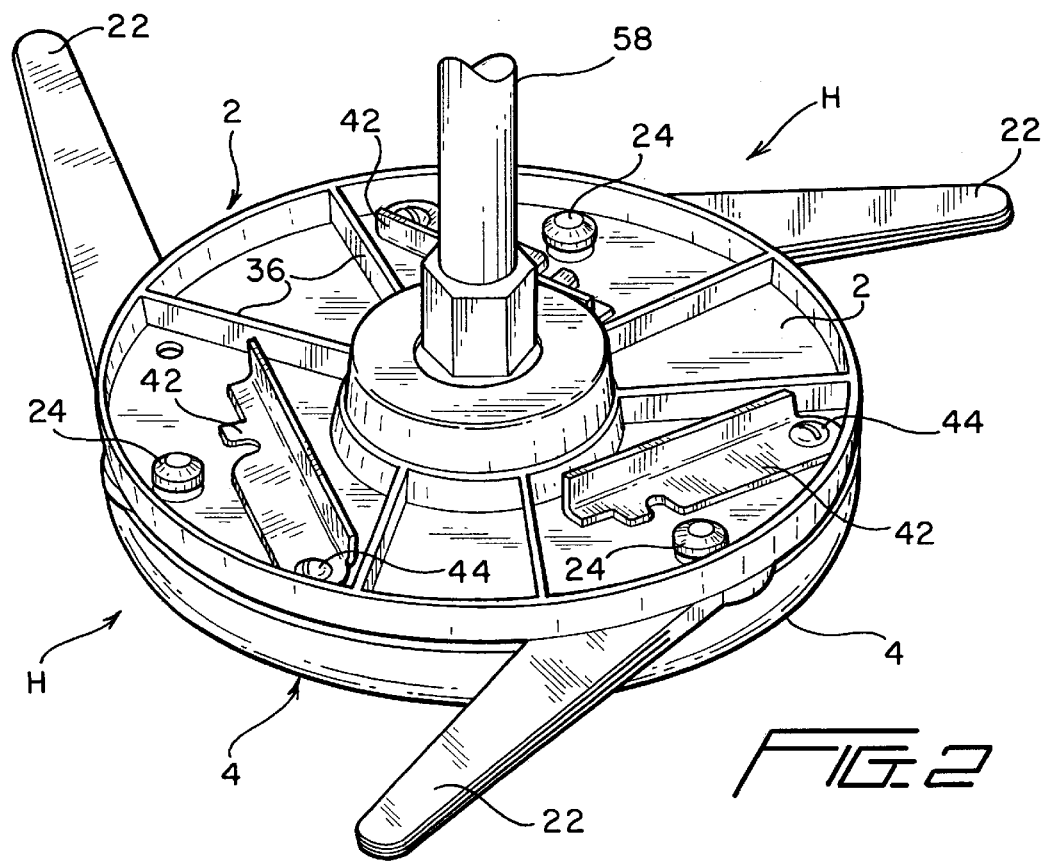
FIG. 2 is a perspective view of the cutting head as shown in FIG. 1 but with the latch mechanisms in an open position.

The cutting head H according to the present invention is best shown in FIGS. 1 through 3. The cutting head H generally comprises a cover member 2 that interfits with a base member 4 and each or which are shown to have a generally circular configuration.

The base member 4 includes a raised hub portion 6 extending upwardly from bottom surface 8. As best shown in FIG. 6, the base member is operably secured by a bolt 60 or other device to a drive shaft (not shown) within drive shaft housing 58. A series of arms or reinforcement ribs 10 extend radially and outwardly from the hub member 6 to an upwardly curved rim 12 of the base member. The exterior surface of the base member 4 is relatively smooth, having a gentle curved surface extending from the rim 12 to the underside surface 14. Both the base member and the cover member may be constructed from stiff plastic or other material adapted to provide strength and rigidity.

Three cutting element mounts 16, 18, and 20 are shown to extend perpendicular from the surface 8 of the base member. As is apparent, both the number and position of the mounts may vary within the scope of the present invention. In the embodiment shown in FIGS. 1 through 3, three mounts are provided as are cooperating blade-like cutting elements 22 within each of the respective mounts 16, 18 and 20.

A cutter post 24 is positioned within each of the blade mounts 16, 18 and 20 and secured by bolts 26 and a washer 28 in a substantially vertical manner to the plane of base member 4. This is best illustrated in FIGS. 6 and 7. The cutter post 24 shown in FIG. 7 has a central cavity containing female threads adapted to mate with the male threads provided on the bolts 26. As is apparent, other means for securing the cutter post 24 to the base member 4 are within the scope of the invention. For example, the cutter post could be secured by rivets, adhesive or even integral molding within the base member 4. The cutter post includes a head portion 28 and neck portion 30 which will be discussed in further detail below.

Turning again to FIG. 3, the cover member 2 is shown to have a generally circular configuration defined by an outer rim member 32 having substantially the same diameter as rim member 12 of base member 4. An interior rim member 34 is also provided. A series of support ribs 36 extend between the outer rim member and the interior rim member 34 and along the top surface 38 of the cover member 2. The bottom surface 40 of the cover member 2 is best shown in FIG. 8. A series of pivoting latch members 42 are mounted by respective securing devices 44 shown in the figures to comprise a nut and bolt arrangement. As is apparent, other securing devices 44 are within the scope of the present invention. For example, a rivet or other member could be provided.

The securing device 44 attaches the latch member 42 to the top surface 38 of the cover member 2 and in a manner so as to permit pivoting of the latch member 2 about securing device 44 in either direction of arrow 46. As can be seen, the latch member 42 comprises an elongated L-shaped unit provided at a first end with a slot 48. The cover member 2 is provided with apertures 50 extending through the cover member 2 from top surface 38 through bottom surface 40. Each aperture 50 is provided to receive and be substantially aligned with the head portions 28 of the cutter post 24.

As best shown in FIG. 3, the cutting blade 22 includes at a first end thereof a mount 52 provided with an aperture 54 to receive the head portion 28 of cutter post 24 to thereby permit the cutter blade to freely pivot about a vertical axis shown by line 56. Alignment of the cuter post 24 with each of the cutter blades 22 and apertures 50 of the cover member 2 is best shown in FIG. 2 which further illustrates the latch members 42 in an open position. FIG. 1 illustrates the latch members in a closed or locked position whereby the respective slot members 48 for each of the latch members 42 are engaged against the cutter post 24 and in particular the respective neck portions 30. This is best shown in FIG. 6 which illustrates the alignment between cover member 2 and base member 4 and where the cutter post 24 is shown extending through the aperture 50 of the cover member 2 and aperture 54 of the cutter blade with the slot member 48 of the latch 42 positioned against the neck portion 30 of cutter post 24. The interior rim member 34 of the cover member 2 lies flush against the surface of the hub member 6 of base member 4.

As shown in FIG. 5, the drive shaft housing 58 of the hand held trimmer is operably associated with a drive shaft (not shown) positioned to rotate within the housing 58. The drive shaft is secured by an appropriate nut and bolt means 60 and in a manner that will permit the cutting head H to be rotated by the drive shaft. As shown in FIG. 5, a guard 62 may be provided and secured to the drive shaft housing 58 to prevent debris from injuring an operator during use of the device.

During use, rotation of the drive shaft will cause the cutting head H likewise rotate at a high rate of speed. The centrifugal forces acting upon the cutting head causes the pivoting latch members 42 to be urged outwardly from the open position shown in FIG. 2 into a closed or locked position shown in FIG. 1. Thus, no manual locking is required to hold the latch member in place during use.

The centrifugal forces also cause each of the cutter blades 22 to pivot outwardly and thereby cut grass, vegetation or other material from around and under a fence, shrubbery or various other articles. The free pivot arrangement of the mount 52 for the cutter blade within the cutting head H also minimizes damage to the blades in the event the blades strike a non-moveable object such as a rock fence post or the like. In that instance, the cutting blade will be forced backwards away from the immovable object and thereby cushion the blow against the blade. The use of the cutter post 24 for mounting of the blades thereby provides improved performance of the cutting operation. In addition, a cutting head H comprising both the cover and base member restricts the amount of dirt or other debris which would otherwise function to clog or impair operation of the pivot arrangement. Also, the cover 2 according to the present invention permits an operator to readily access the interior of the cutting head H without the need for tools or complicated latch mechanisms and in turn readily permits the cutting blades 22 to be changed or replaced. All of these features provide a replacement cutting head of improved cutting ability and simplicity of construction.

Turning to FIGS. 4, 9 and 10, an alternative embodiment to the present invention is shown and includes a molded cutting line which may be used in place of the cutting blades discussed earlier. The molded cutting line 64 is shown to comprise a self-supporting, elongated, generally planar line portion 66 having a circular cross section. In a preferred embodiment, the thermoplastic or other material used in the construction of the molded cutting lines 64 is rigid enough to allow grass to be cut yet pliable enough to permit the cutting line 66 to flex somewhat when striking an immovable object. The molded cutting line 64 is provided with a mount 68 substantially similar to the mount 52 shown for cutting blade 22 and positioned about the cutter post 24 in the same manner. An aperture 70 extends through mount 68 and provides a free pivot thereof. The cutting blade 22 and molding cutting line 64 together with the cutting head H of the present invention permit an operator to readily interchange the cutting members depending upon the nature of the vegetation to be cut. This greatly increases the utility of the cutting head of the present invention.

While this invention has been described as having a preferred design, it is understood that it is capable of further modifications, and uses and/or adaptations of the invention and following in general the principle of the invention and including such departures from the present disclosure as come within the known or customary practice in the art to which the invention pertains, and as may be applied to the central features hereinbefore set forth, and fall within the scope of the invention or limits of the claims appended hereto.

What is claimed is:

1. A self-locking cutting head for a powered trimmer device comprising:
   a) cooperating top and bottom cover members, said bottom cover member is adapted to be operably associated with the drive shaft of a trimmer for rotation thereby and includes at least one pivot member for receiving a pivoting cutting element and extending through said top cover member; and
   b) at least one latch mechanism associated with said top cover member for engaging said at least one pivot member when said top and bottom covers members are mated whereby during rotation of said cutting head, said at least one latch mechanism is urged against said at least one pivot member by centrifugal forces acting upon said at least one latch mechanism to lock said top and bottom cover members together.

2. A cutting head for supporting the cutting members of a powered trimmer device comprising:
   a) cooperating first and second base members, said first base member configured for interconnection to one end of a power trimmer drive shaft for rotation therewith;
   b) at least one support member for pivotally supporting a cutting member, said at least one support member is connected at a first end to said first base member and extends at a second end through said second base member and supports a cutting member disposed between said first and second base members; and
   c) at least one latch member pivotally connected to said second base member and operably associated with said at least one support member whereby rotation of the power trimmer shaft will cause said at least one latch member to be urged by centrifugal force into locked engagement against said second end of said at least one support member.

3. A cutting head as in claim 2 and wherein:
   a) said first base member including a bottom surface having an outer perimeter lip portion and a centrally disposed raised portion extending from said bottom surface for interconnection to a power trimmer drive shaft, the longitudinal axis of said raised portion and the drive shaft being coextensive.

4. A cutting head as in claim 3 and wherein:
   a) said second base member including a bottom surface having an inner perimeter lip portion defining a central passageway therethrough and an outer perimeter lip portion whereby when said first and second base members are engaged, said raised portion extends through said central passageway and said inner perimeter lip portion rests thereagainst.

5. A cutting head as in claim 4 and wherein:
   a) said second base member bottom surface including at least one passageway for receiving said at least one support member therethrough whereby said at least one support member second end extends beyond said base member bottom surface.

6. A cutting head as in claim 4 and wherein:
   a) said at least one latch member having a fixed first end and a movable second end, said fixed first end is pivotally fixed to said second base member bottom surface and said movable second end including an engagement portion configured to receive said at least one support member second end when said at least one latch member is moved into a position of engagement therewith.

7. A cutting head as in claim 2 and further including:
   a) a cutting member, said cutting member including a base portion and a cutting portion, said base portion disposed at one end of said cutting member and includes an aperture for receiving said at least one support member therethrough, said cutting portion extending transverse to the longitudinal axis of said aperture.

8. A cutting head as in claim 7 and wherein:
   a) said cutting portion selected from the group consisting of cutting blades and molded cutting lines.

9. A cutting head as in claim 2 and wherein:
   a) said at least one support member comprising a post having respective first and second ends, said first end including a securing member for rigidly securing said post to said first base member, said second end including a notch for engaging said at least one latch member.

10. A cutting head as in claim 3 and wherein:
    a) said first base member including at least one mount portion, said mount portion positioned adjacent said outer perimeter lip portion and extending along an axis substantially parallel to the axis of said central raised portion.

11. A cutting head for supporting the cutting members of a powered trimmer device comprising:
    a) a base, said base configured for interconnection to a drive shaft of a power trimmer and rotatable therewith;
    b) a plurality of cutting members, each of which is pivotally attached to said base and adapted to swing outwardly therefrom to cut vegetation during operation of said trimmer device; and
    c) means for centrifugally latching said plurality of cutting members to said base, said latching means pivotally connected to said base whereby centrifugal forces generated during rotation of the power trimmer shaft will cause said latching means to be urged into locking engagement with said plurality of cutting members.

12. A cutting head as in claim 11 and further comprising:
    a) means for pivotally supporting said plurality of cutting members, said pivotally supporting means comprising respective post members having first and second ends, said first ends secured to said base and said second ends adapted for engagement with said latching means.

13. A cutting head as in claim 11 and wherein:
    a) said base comprising first and second base members configured for engagement, said first base member comprising a bottom surface having an outer perimeter lip portion and a centrally disposed raised portion extending from said bottom surface for interconnection to the power trimmer drive shaft, the longitudinal axis of said raised portion and the drive shaft are coextensive.

14. A cutting head as in claim 13 and wherein:
    a) said second base member including a bottom surface having an inner perimeter lip portion defining a central passageway therethrough and an outer perimeter lip portion whereby when said first and second base members are engaged, said raised portion extends through said central passageway and said inner perimeter lip portion rests thereagainst.

15. A cutting head as in claim 14 and wherein:
a) said second base member bottom surface including at least one passageway for receiving said respective post members therethrough whereby said respective post member second ends extend above the surface of said base member bottom surface.

16. A cutting head as in claim 14 and wherein:
a) said latching means including at least one latch member having a fixed first end and a movable second end, said fixed first end is pivotally fixed to said second base member bottom surface and said movable second end having an engagement portion configured to receive said respective post member second ends when said at least one latch member is moved into a position of engagement therewith.

17. A cutting head as in claim 11 and wherein:
a) each of said plurality of cutting members having a base portion and a cutting portion, said base portion disposed at one end of each of said plurality of cutting members and includes an aperture for receiving a respective one of said post members therethrough, said cutting portion extends transverse to the longitudinal axis of said aperture.

18. A cutting head as in claim 17 and wherein:
a) said cutting portion selected from the group consisting of a cutting blades and a molded cutting lines.

* * * * *